United States Patent
Watkins et al.

(10) Patent No.: US 9,027,628 B2
(45) Date of Patent: May 12, 2015

(54) INTERIOR SHUTTER-BLIND FOR WINDOWS WITH STACKABLE LOUVERS

(71) Applicant: Comfortex Corporation, Maplewood, NY (US)

(72) Inventors: Richard Watkins, Lake Luzerne, NY (US); Jason Vandervoort, Averill Park, NY (US); John Corey, Melrose, NY (US); Mark Kitterman, Gilbert, AZ (US); Thomas Marusak, Loudonville, NY (US)

(73) Assignee: Comfortex Corporation, Maplewood, NY (US)

( * ) Notice: Subject to any disclaimer, the term of this patent is extended or adjusted under 35 U.S.C. 154(b) by 0 days.

(21) Appl. No.: 13/676,377

(22) Filed: Nov. 14, 2012

(65) Prior Publication Data

US 2014/0033610 A1 Feb. 6, 2014

Related U.S. Application Data

(63) Continuation-in-part of application No. 13/460,326, filed on Apr. 30, 2012, which is a continuation of application No. 12/424,469, filed on Apr. 15, 2009, now Pat. No. 8,201,609.

(51) Int. Cl.
*E06B 9/30* (2006.01)
*E06B 7/086* (2006.01)
(Continued)

(52) U.S. Cl.
CPC . *E06B 7/086* (2013.01); *E06B 7/10* (2013.01); *F16H 21/44* (2013.01); *E06B 7/09* (2013.01); *E06B 7/096* (2013.01); *E06B 9/0638* (2013.01); *E06B 9/0676* (2013.01); *E06B 9/28* (2013.01)

(58) Field of Classification Search
CPC ......... E06B 7/084; E06B 7/086; E06B 9/389; E06B 9/28; E04F 10/10; F24F 13/15; E05F 17/00
USPC ........ 160/166.1, 174 R, 175, 176.1 R, 173 R, 160/178.1 R, 34, 167 R, 172 R, 168.1 R; 49/74.1, 82.1, 86.1, 90.1, 89.1
See application file for complete search history.

(56) References Cited

U.S. PATENT DOCUMENTS 1,708,636 A 4/1929 Shook
1,888,522 A 11/1932 Lawrence
(Continued)

FOREIGN PATENT DOCUMENTS

EP 2351902 A2 * 8/2011

OTHER PUBLICATIONS

Andy Lin, "Paper Clip Your Blinds Open for Better Lighting (Without Sacrificing Privacy)", Feb. 10, 2011; [retrieved from the internet, Mar. 3, 2014: http://lifehacker.com/5757330/paper-clip-your-blinds-for-increased-light-without-sacrificing-privacy.

(Continued)

*Primary Examiner* — Katherine Mitchell
*Assistant Examiner* — Johnnie A Shablack
(74) *Attorney, Agent, or Firm* — Schmeiser, Olsen & Watts LLP (57) ABSTRACT

A shutter-blind system for windows is provided. The system includes a frame and a plurality of rotatable parallel louvers coupled within the frame. Each louver of the plurality of louvers is operatively coupled to adjacent louvers with a collapsible linkage. The system may further comprise a biasing member coupled to a first louver located at a first end of the plurality of louvers and a resisting member coupled to a second louver located at a second end of the plurality of louvers. The biasing member pulls against the resisting member to maintain tension in the collapsible linkage. According to certain embodiments, the frame elements are coupled within a window opening and trim elements are coupled to cover gaps between the frame elements and the window opening.

18 Claims, 13 Drawing Sheets

(51) Int. Cl.
*E06B 7/10* (2006.01)
*F16H 21/44* (2006.01)
*E06B 7/09* (2006.01)
*E06B 7/096* (2006.01)
*E06B 9/06* (2006.01)
*E06B 9/28* (2006.01)

(56) References Cited

U.S. PATENT DOCUMENTS

| | | | |
|---|---|---|---|
| 2,167,840 A * | 8/1939 | Hepworth | 160/172 R |
| 2,708,295 A | 5/1955 | Johnson | |
| 2,874,771 A | 2/1959 | Muhr | |
| 3,001,250 A | 9/1961 | Kenny | |
| 3,208,507 A | 9/1965 | Breen | |
| 3,690,035 A | 9/1972 | Schindlauer | |
| 3,744,544 A * | 7/1973 | Wellensiek | 160/169 |
| 4,155,395 A * | 5/1979 | Frei | 160/168.1 R |
| 4,313,650 A | 2/1982 | Ward et al. | |
| 4,449,563 A * | 5/1984 | Toda et al. | 160/184 |
| 4,616,688 A | 10/1986 | Agos | |
| 4,763,713 A * | 8/1988 | Kraus | 160/172 R |
| 4,850,138 A | 7/1989 | Watanabe et al. | |
| 4,872,499 A | 10/1989 | Anderson | |
| 5,392,561 A | 2/1995 | Henley, Sr. | |
| 5,419,082 A | 5/1995 | Li | |
| 5,469,658 A | 11/1995 | Digianni et al. | |
| 5,474,117 A | 12/1995 | Henkenjohann | |
| 5,595,231 A * | 1/1997 | Marocco | 160/168.1 R |
| 5,813,447 A | 9/1998 | Lysyj | |
| 6,041,547 A | 3/2000 | Marocco | |
| 6,061,962 A * | 5/2000 | Sosa | 49/249 |
| 6,152,205 A | 11/2000 | Toti | |
| 6,314,680 B1 | 11/2001 | Buckwalter et al. | |
| 6,499,255 B1 | 12/2002 | Givoni | |
| 6,536,162 B2 | 3/2003 | LaMay | |
| 6,675,534 B2 | 1/2004 | Marocco | |
| 6,701,669 B1 * | 3/2004 | Yorgason | 49/82.1 |
| 6,810,621 B1 * | 11/2004 | Ricci | 49/90.1 |
| 6,953,074 B2 | 10/2005 | Cardinal | |
| 7,331,370 B1 | 2/2008 | Militello et al. | |
| 7,353,636 B1 | 4/2008 | Anderson et al. | |
| 7,389,609 B2 * | 6/2008 | Yorgason | 49/82.1 |
| 7,866,737 B2 * | 1/2011 | Browne et al. | 296/193.1 |
| 7,896,056 B2 | 3/2011 | Ben-David | |
| 8,201,609 B1 | 6/2012 | Kitterman | |
| 8,281,518 B2 * | 10/2012 | Marocco | 49/82.1 |
| 8,302,653 B2 * | 11/2012 | O'Hair | 160/172 R |
| 8,474,187 B2 * | 7/2013 | Marocco | 49/403 |
| 8,528,254 B1 * | 9/2013 | Johnston | 49/64 |
| 8,555,948 B2 * | 10/2013 | Park | 160/201 |
| 2001/0011581 A1 | 8/2001 | Welfondr | |
| 2004/0045220 A1 | 3/2004 | Fraser et al. | |
| 2005/0005523 A1 * | 1/2005 | Johnston | 49/74.1 |
| 2006/0225844 A1 * | 10/2006 | Gittens et al. | 160/115 |
| 2007/0187048 A1 | 8/2007 | Hung | |
| 2007/0193702 A1 | 8/2007 | Hung | |
| 2008/0099160 A1 | 5/2008 | Chen | |
| 2009/0223149 A1 | 9/2009 | Zalesak | |
| 2012/0097343 A1 | 4/2012 | O'Hair | |

OTHER PUBLICATIONS

PCT International Search Report and Written Opinion for: PCT/US13/69925.

* cited by examiner

INTERIOR SHUTTER-BLIND FOR WINDOWS WITH STACKABLE LOUVERS

CROSS REFERENCE TO RELATED APPLICATION[S]

This application is a continuation-in-part of the earlier U.S. Utility patent application entitled "PANELLESS SHUTTER," Ser. No. 13/460,326, filed Apr. 30, 2012, now pending, which is a continuation of the earlier U.S. Utility patent application entitled "PANELLESS SHUTTER," Ser. No. 12/424,469, filed Apr. 15, 2009, now U.S. Pat. No. 8,201,609, the disclosures of which are hereby incorporated entirely herein by reference.

BACKGROUND OF THE INVENTION

1. Technical Field

This invention relates generally to window covering and more particularly to a interior shutter-blind system.

2. State of the Art

Manufactured window coverings are broadly divided into three categories: shades, blinds, and shutters. Shades are typically single pieces of material that cover a window area and either roll or collapse to uncover the window. These include roller shades, cellular shades, and roman shades. Blinds are typically multi-piece assemblies comprising a number of essentially identical and coordinated slats, louvers, or vanes to cover the window area, and with a deployment system to establish uniform spacing when they are deployed over the window and compress that spacing into a close-stacked array to uncover the window.

Most blinds have the ability to modulate light passage by adjusting the coordinated orientation of the vanes (tilting, collapsing, rotating) to allow a variable degree of open area between adjacent vanes. Examples include venetian blinds, vertical blinds, and cellular blinds. Shutters are multi-piece and blind-like in their spaced and coordinated modulation of light passage by tilting vanes, but the vanes are fixed on their tilt axes in a rigid frame. The frames are typically hinge-mounted to the wall of the window covered, so that the shutter may be swung away from the window to uncover it. Such framed shutters are heavy, difficult to install, expensive, and require strong wall structure to bear the weight at the hinges. For this reason they are almost always installed professionally at significant cost and have been restricted to expensive homes.

Accordingly, there is a need for an affordable shutter-like window covering that provides the upscale appearance of a shutter without the costly custom installation and awkward, difficult swing-out mounting, while incorporating the stackable elements of a blind for ease of installation, view, and cleaning.

DISCLOSURE OF THE INVENTION

The present invention relates to an interior shutter-blind for windows, the shutter-blind including a frame and a plurality of louvers operatively coupled in the frame, the louvers being rotatable and stackable.

An embodiment of the present invention includes a shutter-blind system for windows. The system comprises a frame and a plurality of rotatable parallel louvers coupled within the frame. Each louver of the plurality of louvers is operatively coupled to adjacent louvers with a collapsible linkage. The system may further comprise a biasing member coupled to a first louver located at a first end of the plurality of louvers and a resisting member coupled to a second louver located at a second end of the plurality of louvers. The biasing member pulls against the resisting member to maintain tension in the collapsible linkage. According to certain embodiments, all of the louvers of the plurality of louvers are rotated in a matched rotation in response to rotation of the second louver, preferably by means of the collapsible linkage. Further, all of the louvers are held in a position within their rotational range of motion, by the biasing member acting in response to operation of the resisting member.

Another embodiment of the present invention includes a tilting system for blinds comprising collapsible linkages coupled between adjacent louvers of a plurality of louvers, a biasing member coupled to a first louver located at a first end of the plurality of louvers, and a resisting member coupled to a second louver located at a second end of the plurality of louvers. The biasing member pulls against the resisting member to maintain tension in the collapsible linkages. Further, the plurality of louvers is rotated in response to rotation of the second louver.

Further still, another embodiment of the present invention includes a system for providing a wide range of window treatment sizes. The system comprises a frame assembly. The frame assembly comprises upper, lower, and opposing side frame elements. Each frame element includes first channels along the length, sized to receive substantially L-shaped joiner pieces that frictionally fit in the first channels to form and maintain accurate right-angle corners in the frame. The system may also include adjustable brackets for mounting in a range of window sizes.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to an interior shutter-blind for windows, the shutter-blind including a frame and a plurality of louvers operatively coupled in the frame, the louvers being rotatable and stackable.

Figure 1:
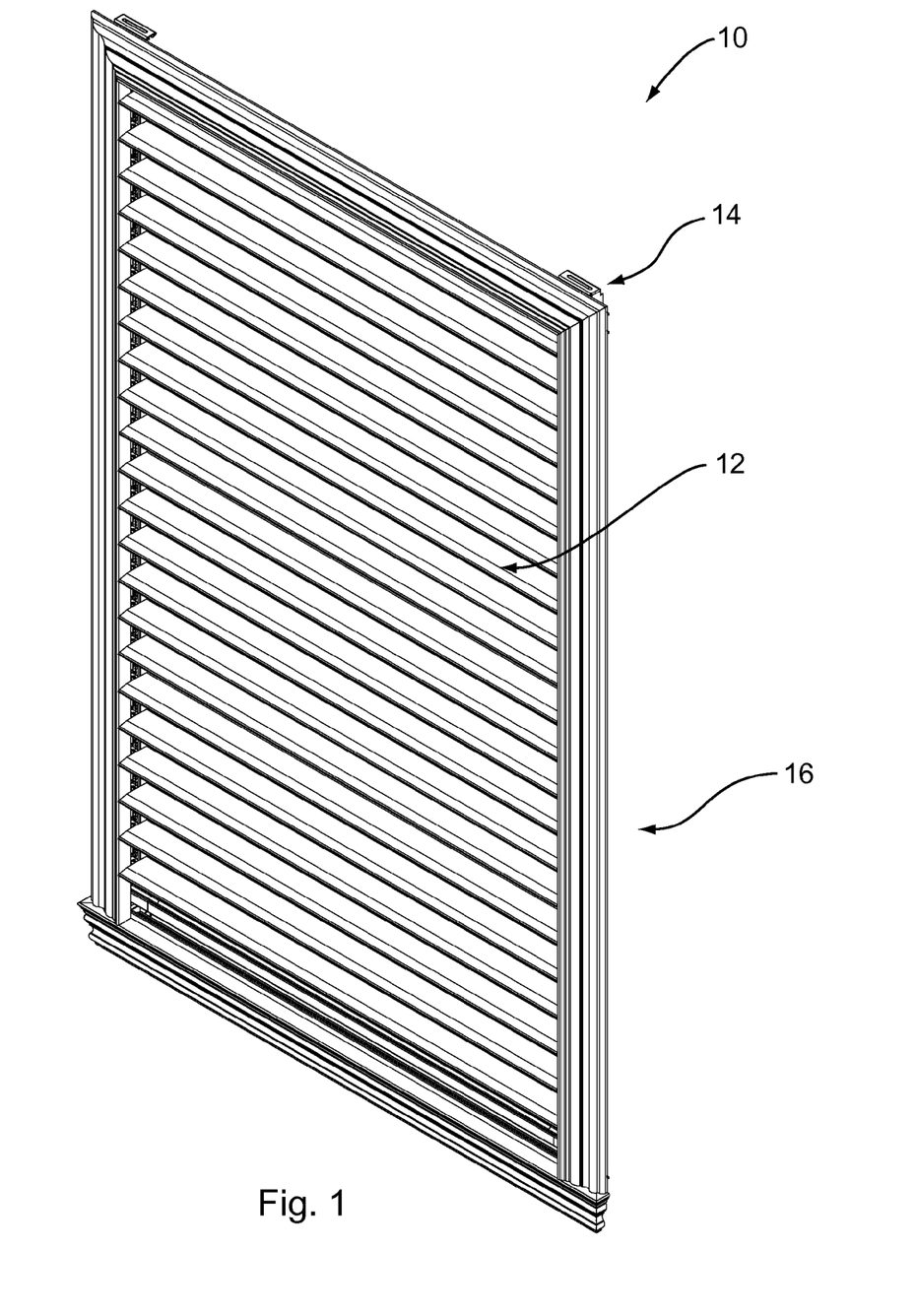
FIG. 1 is a perspective view of an interior shutter-blind system.
Figure 2:
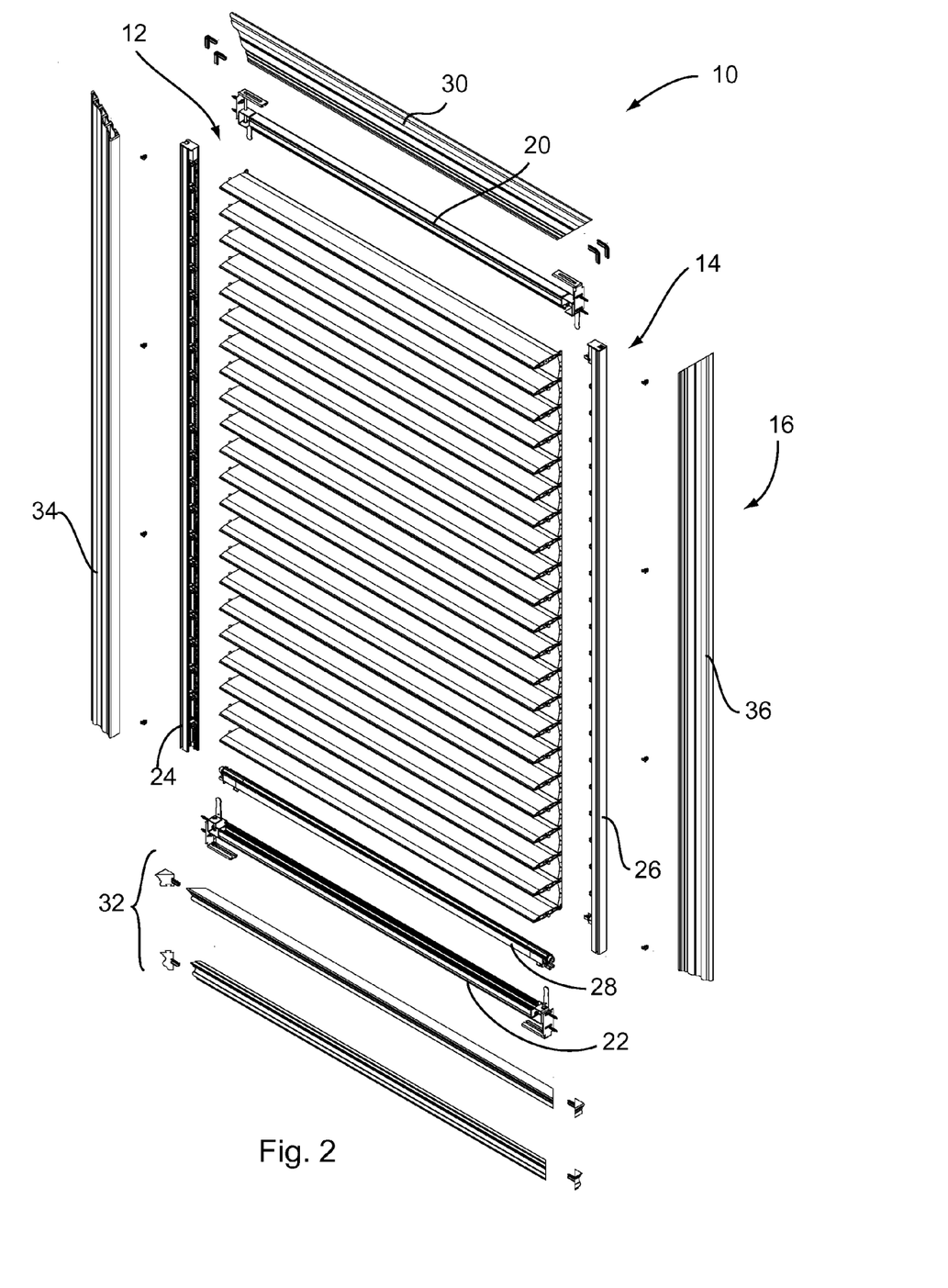
FIG. 2 is an exploded perspective view of the interior shutter-blind system.
Figure 3:
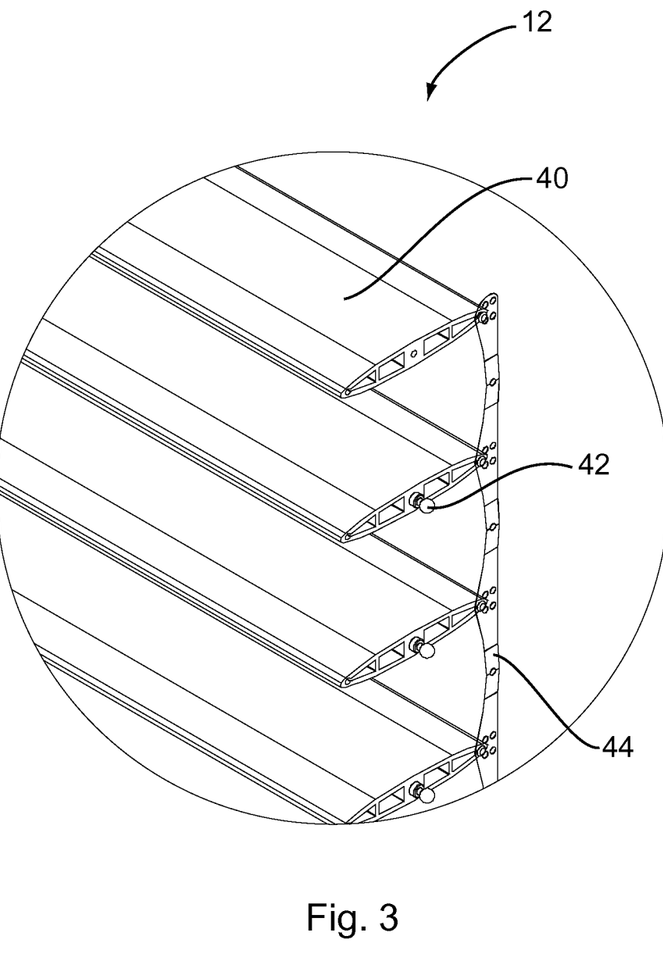
FIG. 3 is a close-up perspective view of a portion of stackable louvers of the interior shutter-blind system.
Figure 4:
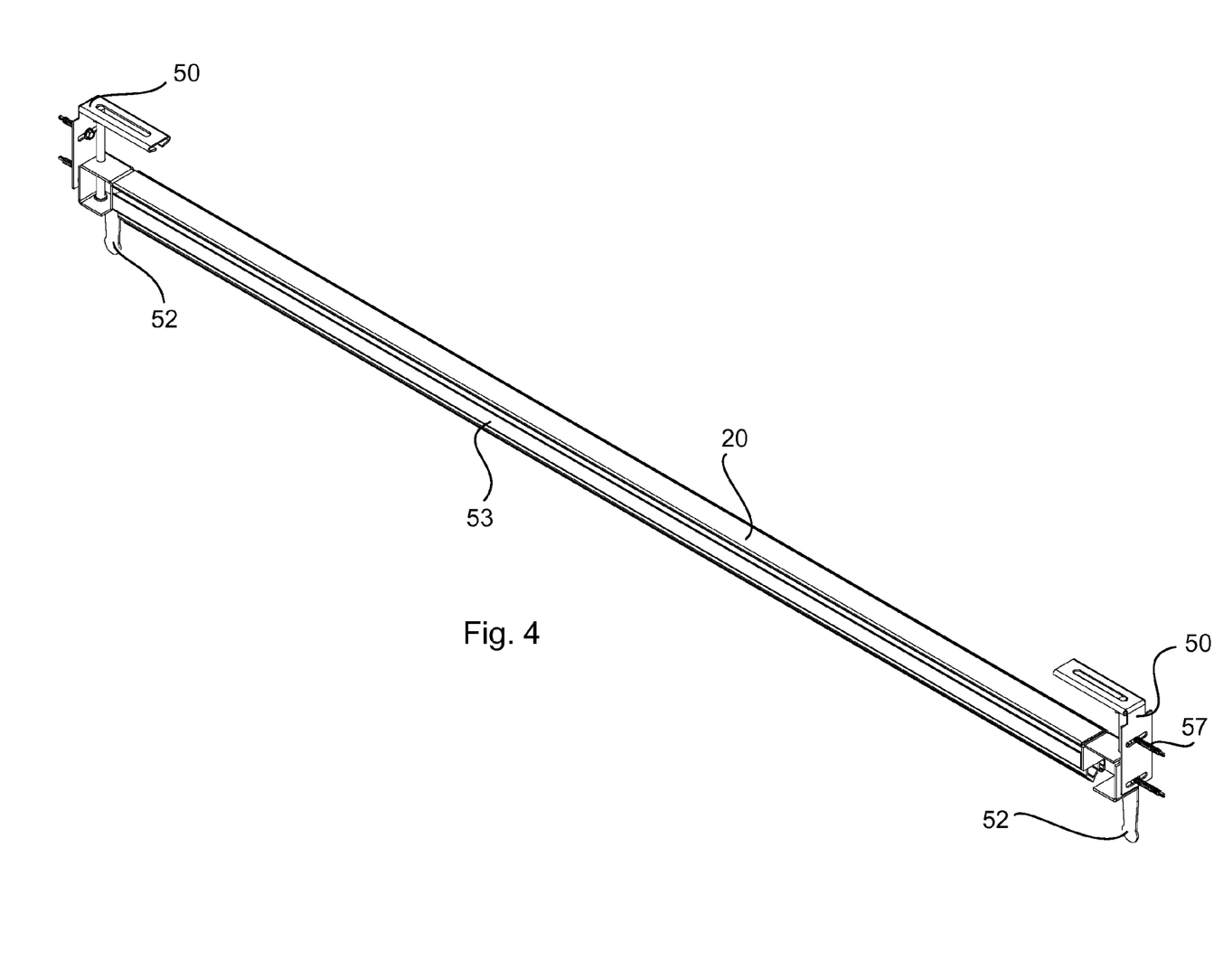
FIG. 4 is a perspective view of a top rail assembly of the interior shutter-blind system.
Figure 5:
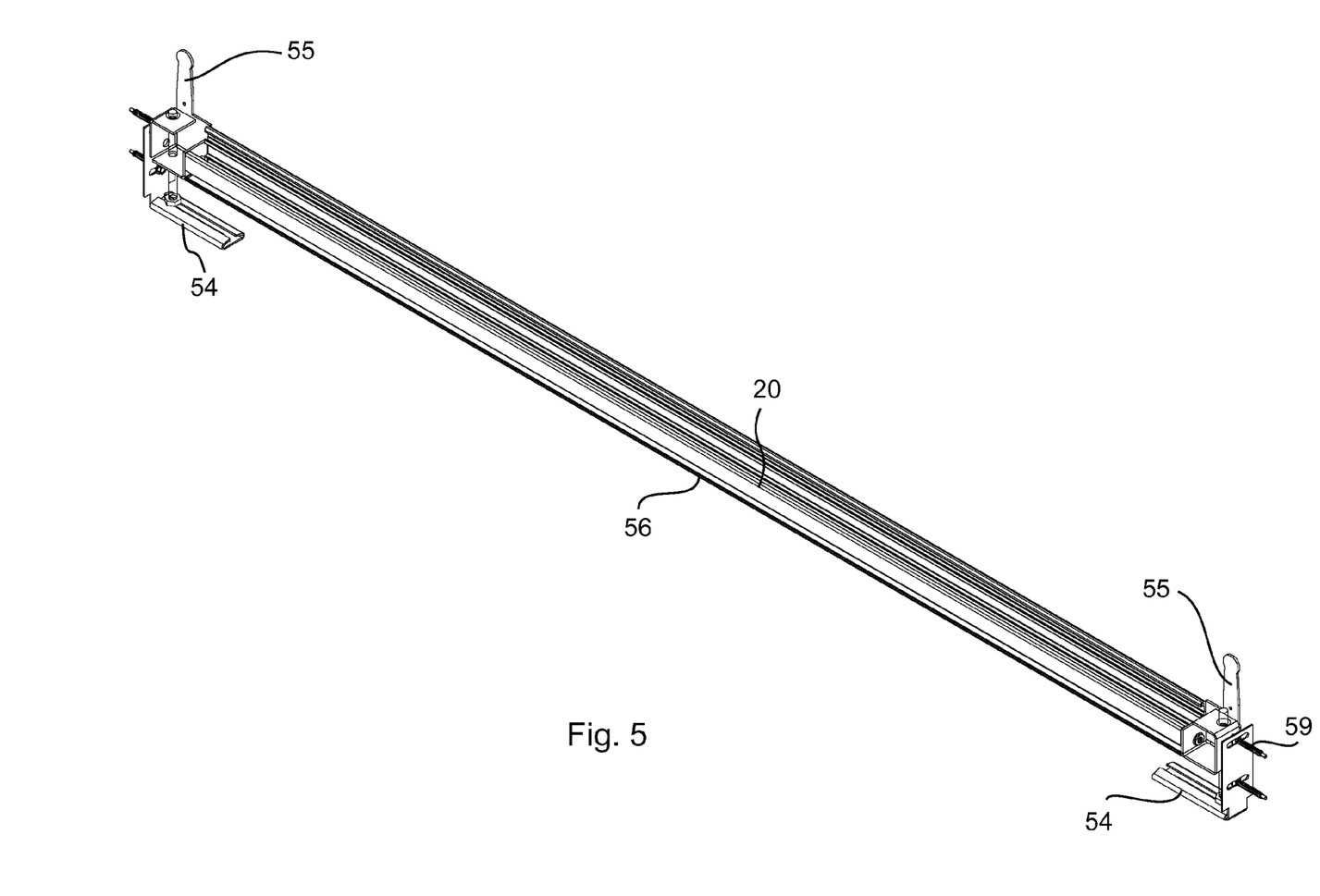
FIG. 5 is a perspective view of a bottom rail assembly of the interior shutter-blind system.

Referring to the drawings, FIGS. 1-3 depict a shutter-blind system 10 comprising a plurality of louvers 12, a frame assembly 14 and a trim assembly 16. The frame assembly 14 comprises a lightweight frame assembly 14 including an upper element 20, a lower element 22, and two side elements 24 and 26. The upper element 20 and lower element 22 are coupled to the side elements 24 and 26 to form a rectilinear configuration. The frame assembly 14 comprises upper L-shaped connectors 52 of brackets 50 coupled to the upper element 20 (see FIG. 4) and lower L-shaped connectors 55 of brackets 54 coupled to the lower element 22 (See FIG. 5) that enforce rectilinearity of the frame assembly 14.

The plurality of louvers 12 includes rotatable parallel louvers 40 coupled within the frame assembly 14. Each louver 40 of the plurality of louvers 14 is operatively coupled to adjacent louvers 40 with a collapsible linkage 44.

Figure 6:
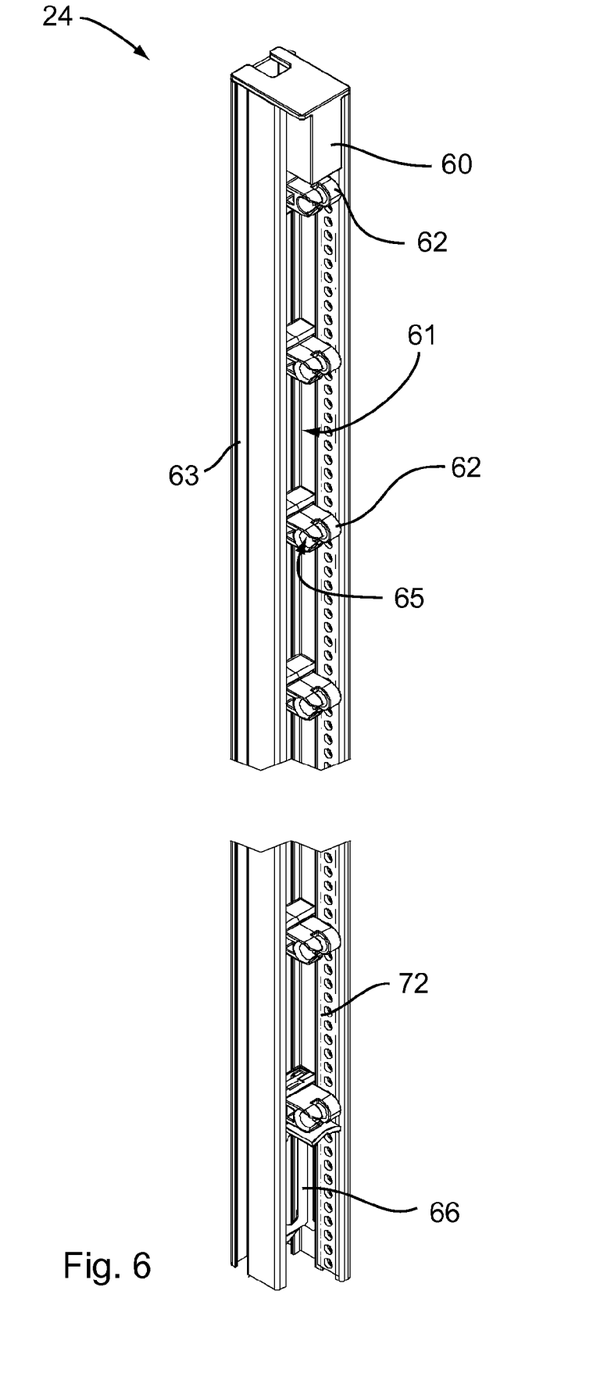
FIG. 6 is a perspective view of a left side rail assembly of the interior shutter-blind system.

With additional reference to the drawings, FIG. 6 depicts a first side frame element 24. The first side element 24 comprises a track 61 with a top block 60 coupled within the track. The top block 60 functions as a stop for the movement of travelers 62 within the track 61. The travelers 62 are configured to couple to louver connectors 42 (See FIG. 3), wherein the louver connectors 42 are rotatable within a socket 65 to allow for rotation of each louver 40 of the plurality of louvers 12. In some embodiments, the louver connector 42 is a ball that fits into a traveler socket 65 of the traveler 62. The first element 24 further comprises a bottom spacer 66 coupled to a bottom most traveler 62 in order to space the traveler 62 from the moving rail 28 of the frame assembly 14, wherein the spacer engages the moving rail 28 and limits upward movement of the traveler 62 relative to moving rail 28.

Figure 7:
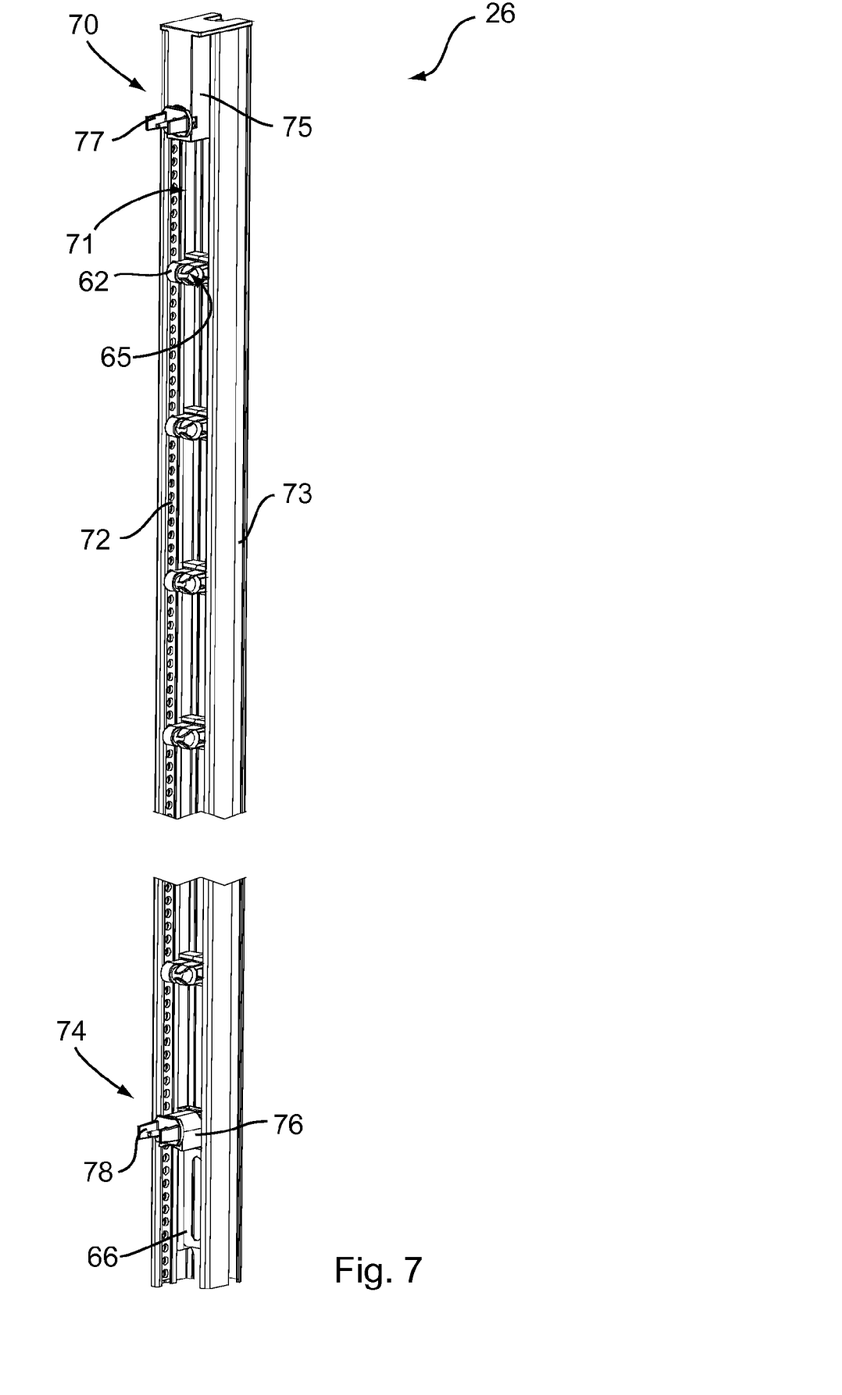
FIG. 7 is a perspective views of a right side rail assembly of the interior shutter-blind.

FIG. 7 depicts a second side frame element 26. The second side element 26 comprises track 71 with a biasing member 70 that comprises a biasing spring housed in a spring block 75 and a louver-engaging mechanism 77 that is operatively coupled between the biasing spring and a first louver 40 located at a first end of the plurality of louvers 12. In some embodiments, the biasing spring is a torsional spring that biases the rotation of the louver mechanism 77 in one of a clockwise or counter-clockwise direction.

The second side element 26 further comprises travelers 62 that move along the track 71. The travelers 62 are configured to couple to louver connectors 42, wherein the louver connectors 42 are rotatable within a socket 65 to allow for rotation of each louver 40 of the plurality of louvers 12. In some embodiments, the louver connector 42 is a ball that fits into a traveler socket 65 of the traveler 62.

The second side element 26 further comprises a resisting member 74. The resisting member 74 comprises a drag or brake 76 and louver-engaging mechanism 78. The louver-engaging mechanism 78 is operatively coupled between the drag 76 and the louver 40 located at a second end of the plurality of louvers 12. The drag 76 of the resisting member functions to resist rotation of the louver 40 located at the second end of the plurality of louvers 12 and therefore resists rotation of all of the louvers 40 of the plurality of louvers 12 by means their connection through collapsible linkage 44.

In operation, the biasing member 70 pulls against the resisting member 74 to maintain tension in the collapsible linkages 44. In other words, the biasing member 70 operates to bias the plurality of louvers 12 to rotate in one of a clockwise or counter clock-wise rotation and the resisting member 74 operates to resist the rotation of the plurality of louvers 12. In particular embodiments, the resisting force of the resisting member 74 is greater than the force of the biasing member 70 to prevent unassisted rotation of the louvers 40 of the plurality of louvers 12. Accordingly, all of the louvers 40 of the plurality of louvers 12 are rotated in a matched rotation in response to rotation of the louver located at the second, drag-coupled end of the plurality of louvers 12, and all of the louvers are held in congruent tilt position with respect to that of the second, drag coupled louver, in response to operation of the biasing member 70, through tensioned collapsible linkage 44.

Because the resisting member 74 creates a drag force, it resists the rotation of the biasing member 70, wherein as the biasing member 70 biases the first louver to rotate in a particular direction while the resisting member resists rotation of the second louver located at the second end of the plurality of louvers 12. The collapsible linkages are coupled to all of the louvers 40 of the plurality of louver 12, wherein as the first louver is biased to rotate a particular direction and the second louver is resistant to rotation, a tension is created along the collapsible linkages 44, wherein all of the louvers 40 are in a matched rotation (congruent tilt) and are maintained in a matched rotated position because of the tension created in the collapsible linkages 44.

Figure 8A:
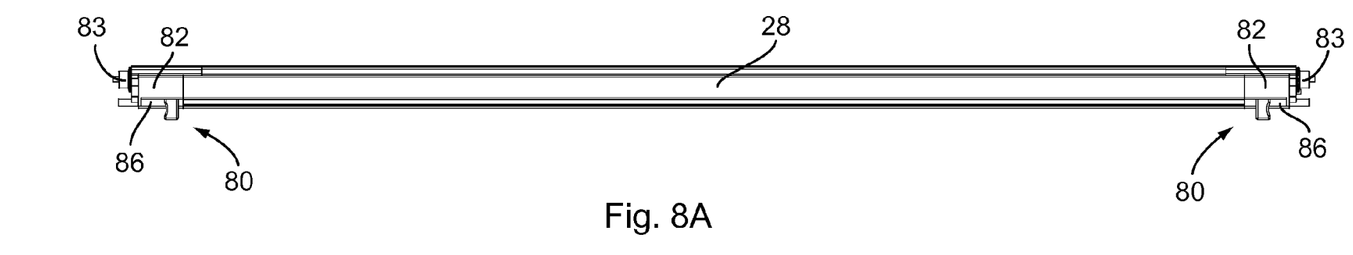
FIG. 8A is a front view of a moving rail assembly of the interior shutter-blind system.
Figures 8B, 8C:
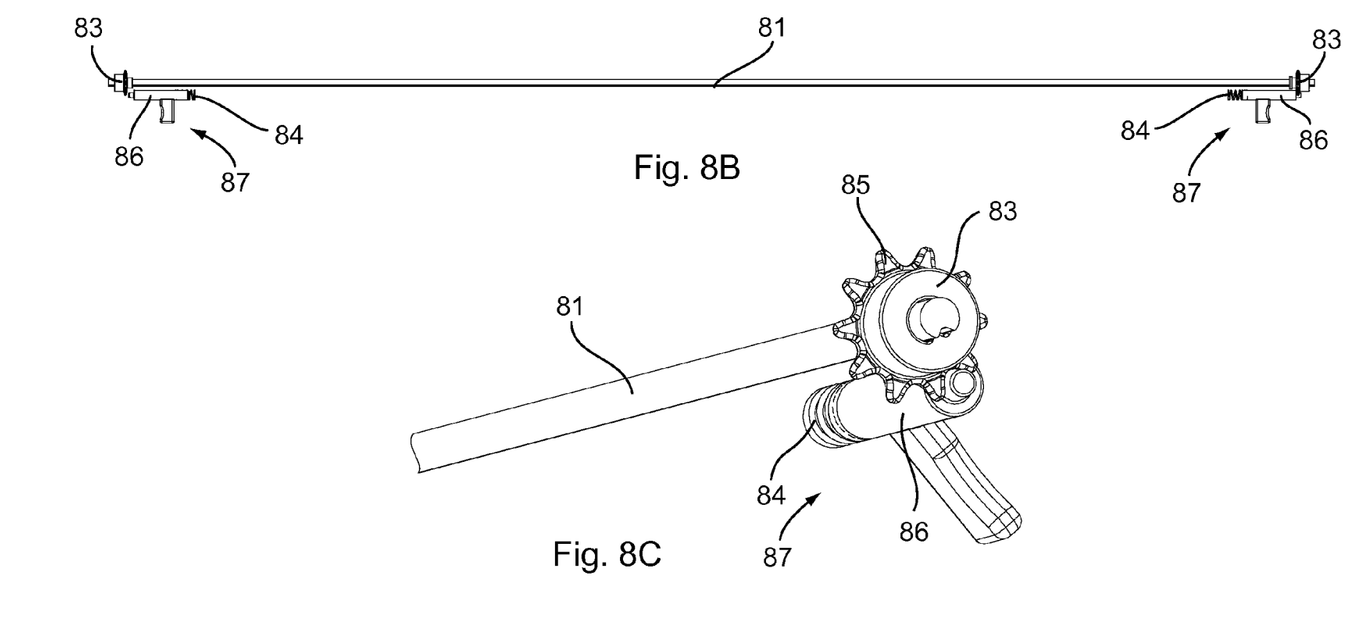
FIG. 8B is a front view of interior components of a moving rail.
FIG. 8C is a perspective view of the interior components of a moving rail.
Figure 9A:
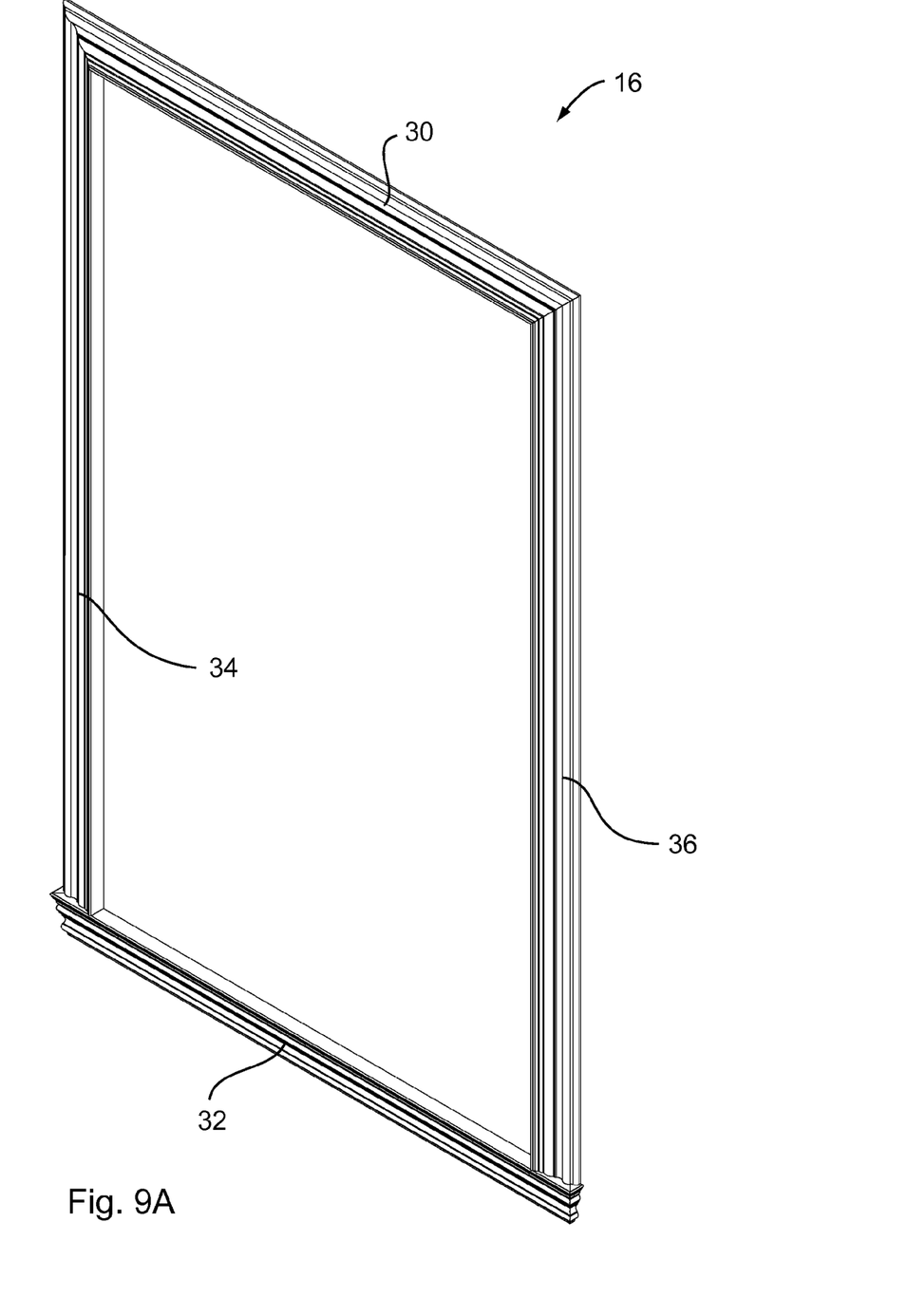
FIGS. 9A-9B are perspective views of a molding assembly of the interior shutter-blind system.
Figure 9B:
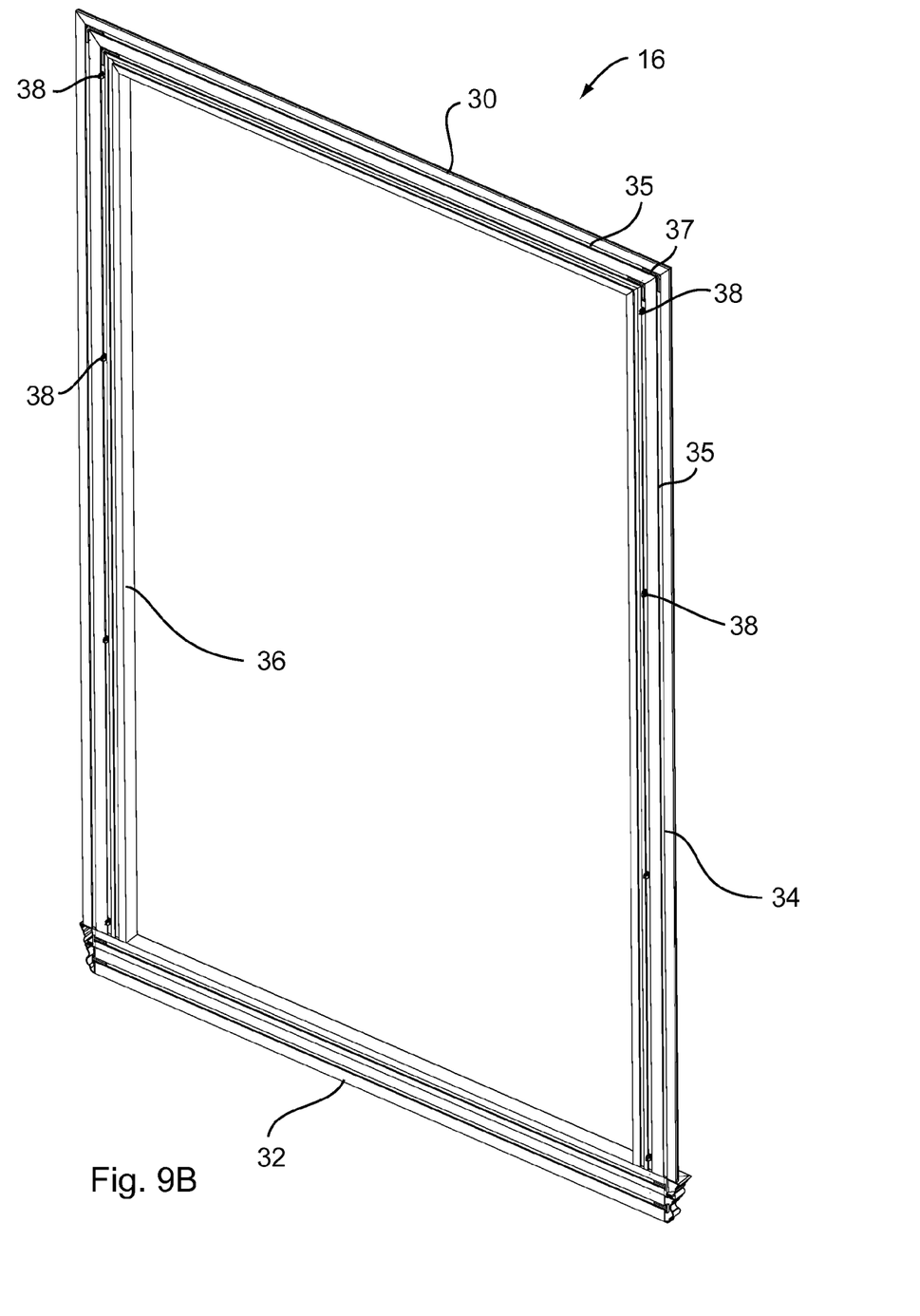

The first side element 24 may include a rack 72 along the length of the track 61, wherein the rack 72 comprises a plurality of evenly spaced apertures along the length of the rack 72. The second side element 26 may also include a rack 72 along the length of the track 71, wherein the rack 72 comprises a plurality of evenly spaced apertures along the length of the rack 72. A moving rail 28 may be operatively disposed between the side elements 24 and 26, wherein the moving rail 28 is parallel to and between the upper and lower elements 20 and 22 of the frame assembly 14. The moving rail 28 includes a shaft 81 extending there through with gear members 80 coupled on opposing ends of the shaft 81. The gear members 80 comprise gears 83 engaged for common rotation at either end of the shaft 81. The gear members 80 further include and end block 82, a spring 84, a plunger 86 that engages a gap 85 in gear 83. The end block 82 operationally retains the spring 84 coupled to the plunger 86 within the end block 82. The teeth 65 of the gears 83 engage the racks 72 of the tracks 61 and 71. For example, the teeth 65 of the gear 83 engage the apertures of the rack 72, wherein as the gear 83 rotates, the teeth 85 of the gear 83 engage adjacent apertures and the gear 83 moves along the length of the rack 72. The gears 83 are coupled together through the shaft 81 to move together and maintain a substantially horizontal position for middle rail 28 as they engage the rack members 72 in side rails 24 and 26. The moving rail 28 further comprises a locking device 87 that comprises the plunger 86 and the spring 84 to prevent rotation of the gears 83 except when released by the hands of an operator seeking to reposition the moving rail 28. When released, the gears 83 are free to rotate, doing so in response to lifting or lowering the moving rail 28, wherein the gears 83 operatively engage the racks 72 and rotate along the length of the racks 72 as described previously. Once a desired location of the moving rail 28 is selected, the operator can engage the locking device 87 again and prevent rotation of the shaft 81 and movement of the moving rail 28.

Figure 10:
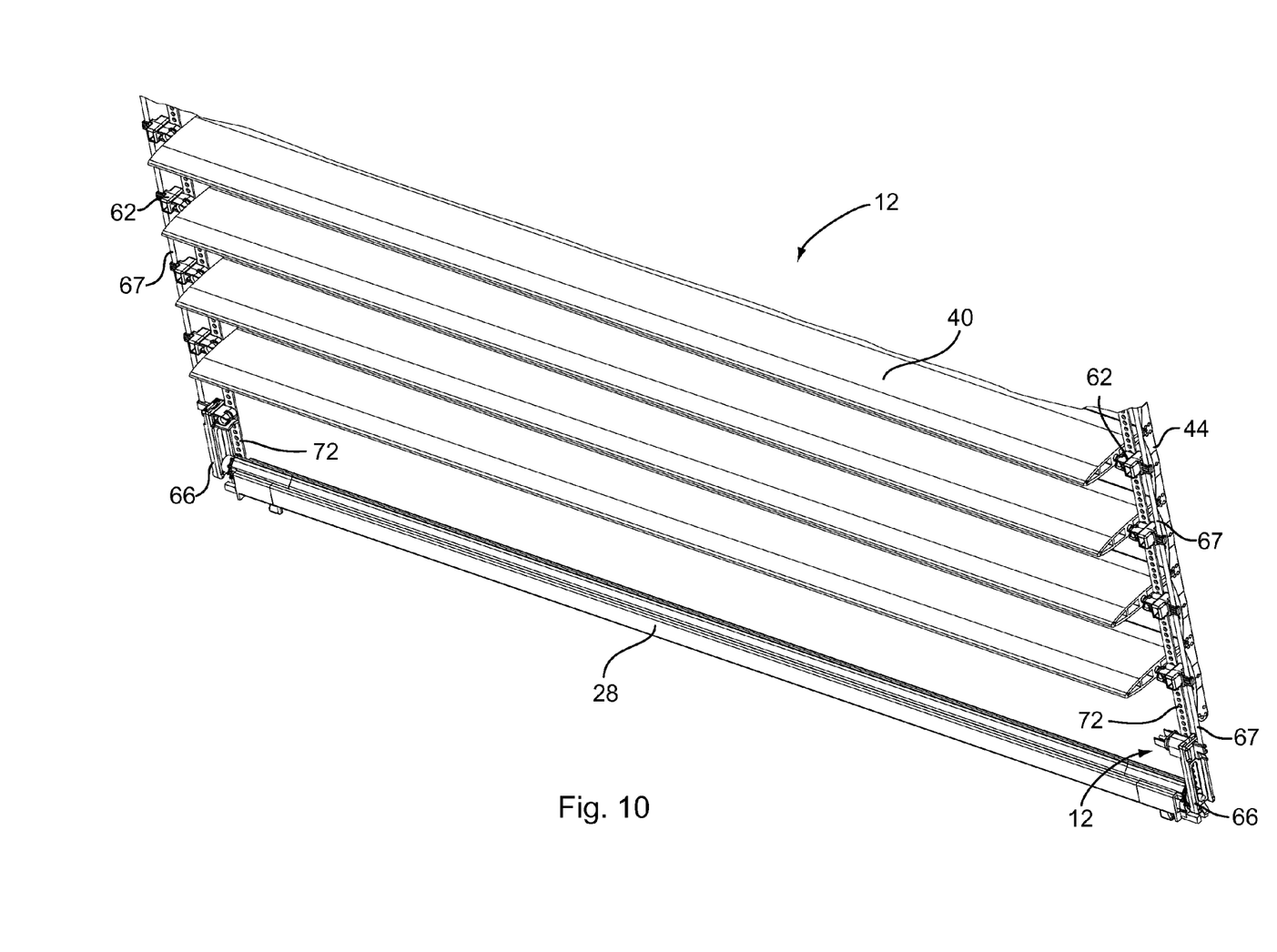
FIG. 10 is a perspective view of a plurality of louvers coupled between side frame elements (outer portions of the side frame elements are removed to show interior components of the side frame elements) with the moving rail engaging racks of the side frame elements, wherein the bottom louver is removed to show the engagement of the moving rail with the racks.

According to particular embodiments, and with additional reference to FIG. 10, the moving rail has gear members 80 on opposing ends of the rail 28. The engagement and disengagement of the locking devices 87 occurs in response to operation of the plungers 86. The springs 84 bias the plungers 86 away from each other and away from the ends of the moving rail 28. The locking devices 87 are coupled to the plungers 86 such that movement of the plungers 86 results in movement of the locking devices 87. The biased plungers 86 also bias the locking devices 87 to extend between adjacent teeth 85 of the gear 83, preventing rotation of the gear 83 engaged onto the shaft 81. This keeps the moving rail 28 from moving up or down. To actuate or move the moving rail 28, an operator may insert index fingers outboard of triggers of the plunger 86 and by pressing his fingers toward one another, compresses both springs 84 and draws in the plungers 86 and the locking device 87 away from the teeth 85 of the gears 83, thereby freeing the gears 83 and shaft 81 to rotate together and thereby to move up and down the racks 72 in the side rails. The user fingertips also bear the weight of the moving rail 28 to move it to a new position, wherein release of the pressure on the triggers re-locks the gears 83 in the new place. The engagement of the gears 83 on the shaft 81 compels them to rotate altogether as one, as the two gears 83 engage the two racks 72, thereby preventing either end of moving rail 28 from rising or falling with respect to the other end, and so maintaining the moving rail 28 in parallel relation to top and bottom rails 20 and 22 under all operating conditions and up or down movements of the rail 28.

Assembly of the shutter-blind system 10 includes assembling the frame elements 20, 22, 24, 26 and 28; and placing them within a window opening. For example, the top frame element 20 may be coupled within the window opening adjacent a top end of the window opening by coupling the brackets 50 with adjustable screws to the surrounding surfaces of the window opening. Typically, to install the shutter-blind, the frame is first assembled on a horizontal surface by engaging the L-shaped members 52 of the top rail 20 to the side rails 24 and 26. Then the moving rail 28 is inserted, engaging the gears 83 into the racks 72 of the side rails 24 and 26. Last the bottom rail 22 is fitted to the other ends of the side rails 24 and 26 to complete the frame 14. Then mounting brackets 50 and 54 are secured to the window frame at its corners and the assembled frame is lifted into position, by engaging the ends of the lower adjusting screws 59 into receiving slots in the lower brackets 54. Extending the upper screws 57 to engage them in the slots of the upper brackets 50, sliding the frame laterally to center it in the opening, and tightening screws 57 and 59 to level and vertically center the frame completes the mounting of the frame to the window opening.

Then the assembly includes coupling a plurality of louvers 12 (equivalently, slats or vanes) between the side elements 24 and 26, wherein the louvers 40 of the plurality of louvers 12 are parallel to and between the upper element and the moving rail 28 that is also coupled between the side elements 24 and 26. The louvers 40 of the plurality of louvers 12 are held in uniform collapsible spacing by collapsible spacers 67 and travelers 62 located at opposing ends of each louver 40, which allow rotation of the louvers 40 about their long axes. Further, a first louver is coupled to a biasing member 70 located at a first end of the plurality of louvers 12. The biasing member 70 biases the rotation of the first louver, and all louvers through collapsible spacers 67, in a direction that tends to bring each louver 40 into contact with the adjacent louver 40; that is an equivalent extreme tilt position, a maximum light blocking position where louvers overlap and abut one another (See FIG. 10).

A collapsible linkage 44 is installed and connects one outer end corner (or other position away from the rotation axis) of each louver 40 to its adjacent louvers 40 in the plurality of louvers 12. The lengths of the collapsible linkages 44 are substantially equivalent to the length of the collapsible spacers 67 when fully extended and allow contact stacking of the louvers 40 when collapsed (See FIG. 10).

Once the plurality of louvers 12 are operatively coupled within the frame assembly 14, optionally, a fascia trim assembly 16 may be installed to cover any gaps between the frame assembly and the window opening to which it is installed. The trim assembly 16 may include upper trim element 30, lower trim element 32 and side trim elements 34 and 36. Each trim element includes deformable projections 38 inserted into channels 35 on the back of trim elements 30, 32, 34 and 36. The upper frame element 20 includes a second channel 53, the bottom frame element 22 includes a second channel 56, the first side frame element 24 includes a second channel 63 and the second side frame element 26 includes a second channel 73. The trim elements 30, 32, 34 and 36 are affixed to a corresponding frame element 20, 22, 24 and 26 in response to pressing the projections 38 coupled to each trim element 30, 32, 34 and 36 into the channels 53, 56, 63 and 73. Further, the trim elements 30, 32, 34 and 36 may be coupled to proper adjacent trim elements, such as the upper trim element 30 coupled to the side trim element 36 by use of connector 37. In some embodiments, connector 37 may be an elbow connector, wherein the connector 37 couples the upper trim element 30 with the side trim element 36 at a substantially right angle. Connectors 37 may be slidingly engaged with channels 35.

Figure 11:
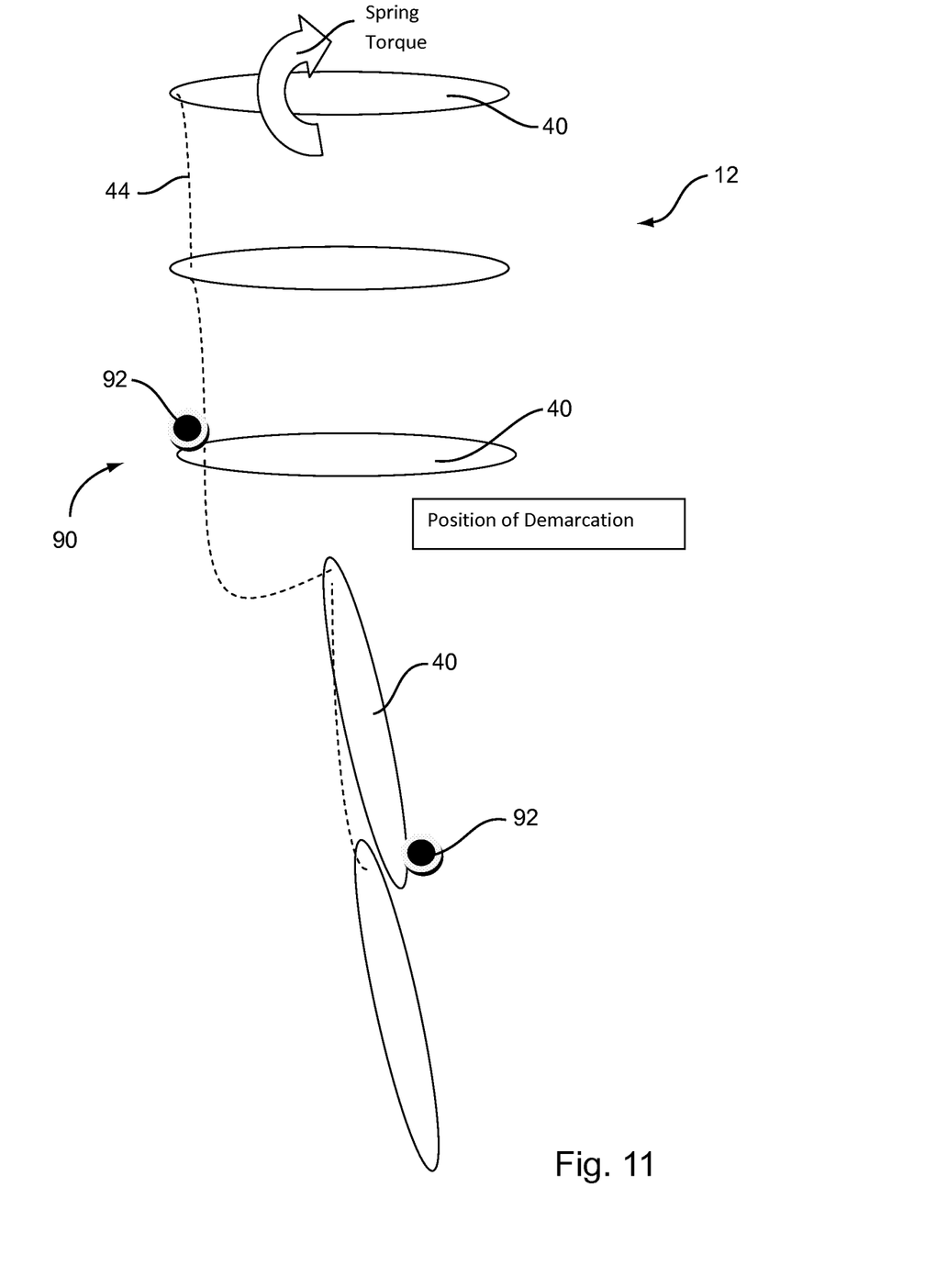
FIG. 11 is a side view of a top view-bottom privacy device for use with a shutter-blind system.
Figure 12:
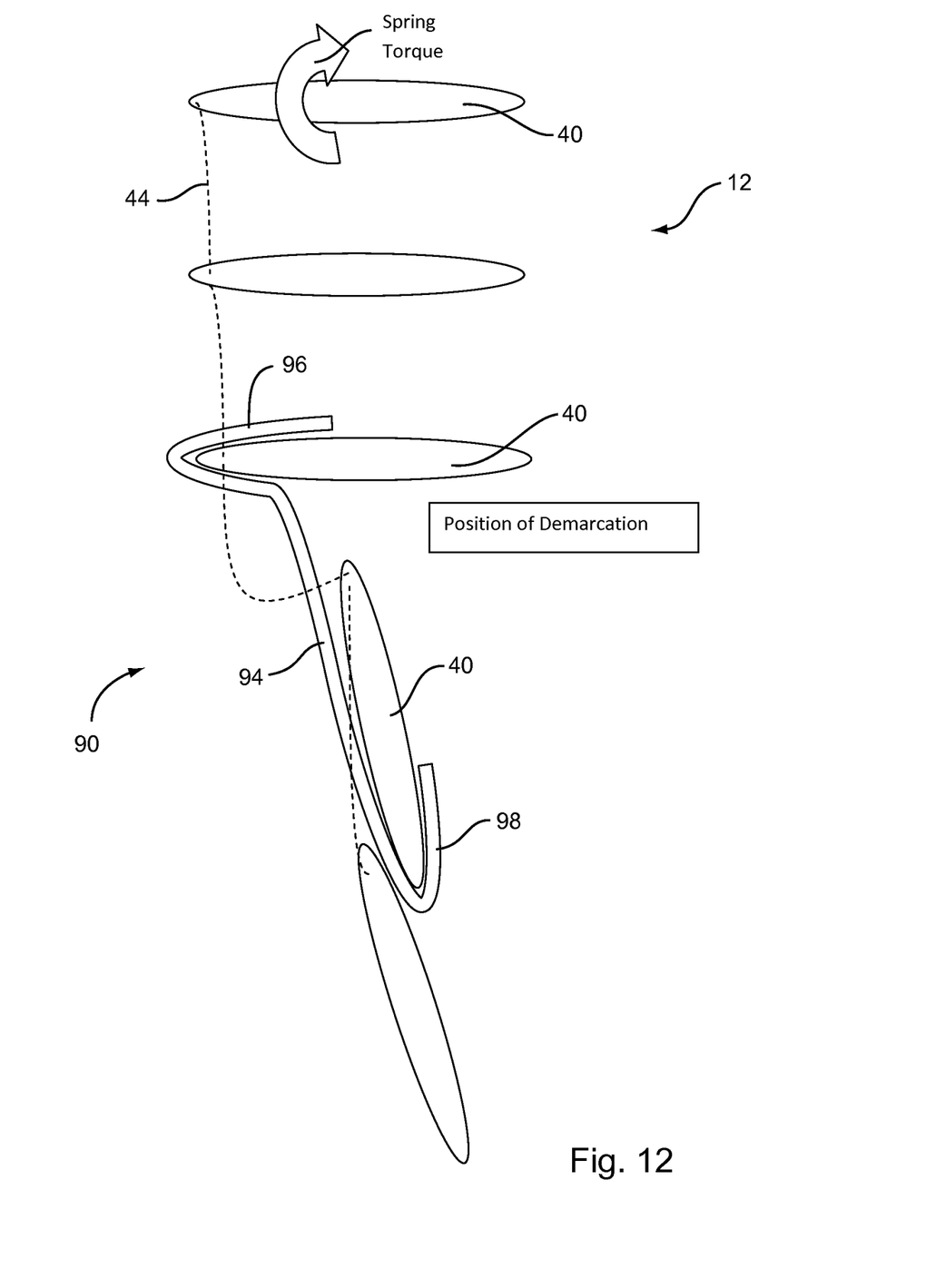
FIG. 12 is a side view of another top view-bottom privacy device for use with a shutter-blind system.

Referring further to the drawings, FIGS. 11 and 12 depict embodiments of top view-bottom privacy device 90 according to the present invention. As indicated above, the plurality of louvers 12 rotate in a matched rotation and continue to do so if there is no interference. Generally, the position of the louver 40 located at the second end of the plurality of louvers 12 is coupled to a resisting member 74 and dictates the general orientation of all of the louvers above it. The top view-bottom privacy device 90 interrupts the force relationship between the top louver 40 coupled to the biasing member 70 and bottom louver 40 coupled to the resisting member 74 in such a way that the top louvers tend to remain in an open position while the bottom louvers tend to remain in a closed position. The position of demarcation between top open and bottom closed may be selected arbitrarily by a user. To achieve top view-bottom privacy, a force decoupling device 92 may be introduced at the point at which it is desired to maintain louvers below it closed and louvers above it opened, or point of demarcation. In some embodiments, more than one force decoupling device(s) 92 may be utilized. The purpose of the force decoupling device 92 is to prevent the biasing member 70 from transmitting torque to the louvers immediately below the desired view through demarcation point. For example, one force decoupling device 92 may be placed in contact with a louver 40 to stop rotation of the louver 40 an open position and a second force decoupling device may be placed in contact with an adjacent louver 40 to restrain the adjacent louver 40 from rotating, thereby keeping it in the closed position and further keeping all louver below it in a closed position as shown in FIG. 11.

The top view-bottom privacy device 90 may also be in the form of a clip device 94, wherein the clip 94 engages two adjacent louvers 40 at the position of demarcation. The clips has a first receiving member 96 and a second receiving member 98, wherein the first receiving member couples to a louver 40 to hold it in an open position at the point of demarcation and the second receiving member 98 couples to the lower adjacent louver 40 to maintain it in a closed position. Alternatively, independent "holders" could be placed either on appropriate locations on the vertical rail near each louver that needs to be restrained or could extend from the ends of each louver to restrain the louver against the vertical rail.

According to particular embodiments, the frame elements are produced in multiple predetermined sizes with vertical dimensions corresponding to whole numbers of uniformly spaced louvers, and the extension of trim elements is sufficient to cover a range of window sizes corresponding to each incremental frame size. Further, the frames are produced in multiple predetermined sizes with width dimensions incrementally sized to enable the extension of trim elements to cover a range of window sizes corresponding to each incremental frame size. Because the trim elements cover the gap between frame elements and window opening, and the trim elements have a particular width, the frame does not have to be custom cut to fit within the window as do conventional shutters. Most windows vary, even if slightly, from the common measurements for a particular window size, and embodiments of the present invention provide the opportunity to fit within a wide range of windows even those that are not exactly the common length since the trim elements cover any gap between the frame elements and the window opening.

Additionally, window openings that have a great width may utilize multiple frame assemblies coupled adjacent to each other, wherein the trim elements may then be utilized to cover all of the frame elements, and further cover any gaps between the frame elements and the window opening.

It is contemplated that at the point of sale, such as in a home goods store, the frame elements, louvers and trim elements may be pre-packaged to accommodate a wide range of window sizes. For example, and not as a limitation, vertical frame elements of the same size may be packaged together. The store may stock varying lengths of two pack vertical frame elements. Likewise, horizontal frame elements of the same size may be packaged together, wherein the store may stock varying lengths of two pack horizontal frame elements, together with the corresponding moving rail element. The vertical and horizontal frame elements are chosen to fit a particular window and may be purchased at the store. In this way, a user may have a variety of window sizes that can utilize the shutter-blind assembly according to embodiments of this invention. The trim elements are chosen based on the lengths of the vertical and horizontal frame elements, or are packaged together with frame elements of corresponding dimension.

As previously stated, vertical dimensions of the vertical frame elements correspond to whole numbers of uniformly spaced louvers. The store may stock a package of a predetermined number of louvers to which the vertical dimension corresponds. For example, the predetermined number may be 3, however, any number may be utilized with departing from the scope of this invention.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A shutter-blind system for windows, the system comprising:
 a frame assembly;
 a plurality of rotatable parallel louvers coupled within the frame assembly, each louver of the plurality of louvers operatively coupled to adjacent louvers with a collapsible linkage, wherein the collapsible linkage couples one outer end corner of each louver to one outer end corner of an adjacent louver on a same side of the plurality of louvers;
 a biasing member coupled to a first louver located at a first end of the plurality of louvers; and
 a resisting member coupled to a second louver located at a second end of the plurality of louvers, the biasing member pulling against the resisting member to maintain tension in the collapsible linkages, wherein:
  all of the louvers of the plurality of louvers are rotated in a matched rotation in response to rotation of the second louver; and
  all of the louvers are held in position in response to operation of the biasing member acting against the resisting member.

2. The blind system of claim 1, wherein the resisting member is a frictional resisting member.

3. The blind system of claim 1, wherein the collapsible linkage is flexible.

4. The blind system of claim 1, wherein the collapsible linkage is jointed.

5. The blind system of claim 1, further comprising a top view-bottom privacy device, wherein the louvers above a point of demarcation are held in an open position and the louvers below the point of demarcation are held in a closed position.

6. The blind system of claim 5, wherein the top view-bottom privacy device comprises force decoupling devices that retain a louver in the open position and an adjacent louver in the closed position, the force decoupling devices located at the point of demarcation.

7. The blind system of claim 5, wherein the top view-bottom privacy device comprises a clip device comprising a first receiving member and a second receiving member, wherein the first receiving member couples to a louver and retains it in the open position and the second receiving member couples to a lower adjacent louver and retains it in the closed position, the clip device located at the point of demarcation.

8. The blind system of claim 1, wherein in one of the first or second ends of the plurality of louvers is moveable in a direction transverse to axes of rotation of the plurality of louvers.

9. The blind system of claim 8, further comprising a moving rail coupled at the moveable first or second end.

10. The blind system of claim 9, wherein the moving rail comprises a shaft torsionally connected with gears at each end that engage the side frame elements.

11. The blind system of claim 10, wherein the opposing side frame elements comprise racks, wherein the gears of the moving rail engage the racks to maintain the moving rail substantially level during movement.

12. A tilting system for blinds comprising:
 collapsible linkages coupled between adjacent louvers of a plurality of louvers, wherein the collapsible linkage couples one outer end corner of each louver to one outer end corner of an adjacent louver on a same side of the plurality of louvers;

a biasing member coupled to a first louver located at a first end of the plurality of louvers; and a resisting member coupled to a second louver located at a second end of the plurality of louvers, wherein the biasing member pulls against the resisting member to maintain tension in the collapsible linkages;

wherein the plurality of louvers are rotated in response to rotation of the second louver.

13. The tilting system of claim 12, wherein the resisting member is a frictional resisting member.

14. The tilting system of claim 12, wherein the spacing member is flexible.

15. The tilting system of claim 12, wherein the spacing member is jointed.

16. The tilting system of claim 12, wherein in one of the first or second ends of the array of louvers is moveable in a direction transverse to axes of rotation of the array of louvers.

17. The tilting system of claim 16, further comprising a moving rail coupled at the moveable first or second end.

18. The tilting system of claim 17, wherein louvers rotate in response to the moving rail contacting the louvers as it is moved toward the opposing non-moving first or second end.

\* \* \* \* \*